United States Patent
Woerner et al.

[11] Patent Number: 6,075,439
[45] Date of Patent: Jun. 13, 2000

[54] DEVICE FOR CURRENT OR VOLTAGE SUPPLY IN VEHICLE

[75] Inventors: Dieter Woerner, Eppingen, Germany; Joachim Sedlmayr, Broadview, Ill.; Hermann Goebels, Galesburg, Mich.

[73] Assignee: Robert Bosch GmbH, Stuttgart, Germany

[21] Appl. No.: 08/805,977

[22] Filed: Feb. 25, 1997

[30] Foreign Application Priority Data

Mar. 8, 1996 [DE] Germany .............................. 196 08 970

[51] Int. Cl.⁷ ............................................... G08B 21/00
[52] U.S. Cl. .................... 340/431; 340/458; 340/641; 307/10.8; 324/504
[58] Field of Search ....................... 340/431, 458, 340/635, 641; 307/10.8; 324/504, 503

[56] References Cited

U.S. PATENT DOCUMENTS 4,430,637  2/1984  Koch-Duecker et al. ............... 340/431
5,030,938  7/1991  Bondzeit ................................. 340/431

FOREIGN PATENT DOCUMENTS

OS3808724  2/1992  Germany .
1 462 631  1/1977  United Kingdom .

*Primary Examiner*—Daryl Pope
*Attorney, Agent, or Firm*—Michael J. Striker

[57] ABSTRACT

A device for current or voltage supply in a vehicle trailer or vehicle support which is connected with a pulling vehicle through at least one braking light conductor and an indicating conductor and has at least one electrical consumer, the device has an indicator formed so that a current flows through the indicator permanently and its intensity is selected so that in an error-free operation the indicator does not respond, while a voltage supply to an electrical consumer of the vehicle trailer is performed by the current.

8 Claims, 1 Drawing Sheet

DEVICE FOR CURRENT OR VOLTAGE SUPPLY IN VEHICLE

BACKGROUND OF THE INVENTION

The present invention relates to a device for current or voltage supply in a vehicle trailer or a vehicle support, which is connected with the pulling vehicle through at least one braking light conductor and an indicating conductor.

Devices of the above mentioned general type are known in the art. One of such devices is disclosed for example in the German patent document D OS 38 08 724. In this reference a vehicle trailer or a vehicle support with an anti-blocking regulation has a control device with a regulator electronic, device arranged in the vehicle trailer itself. The current supply for this control device is provided from the signals of at least one sensor, for example a rotary speed sensor, which measures the wheel speed of a vehicle wheel of the vehicle trailer. Furthermore, it is known that the current supply for at least one power amplifier in the vehicle trailer is performed through the brake light conductor supplied in the brakes from the pulling vehicle.

SUMMARY OF THE INVENTION

Accordingly, it is an object of the present invention to provide a device for current or voltage supply in a vehicle trailer or vehicle support, which avoids the disadvantages of the prior art.

In keeping with these objects and with others which will become apparent hereinafter, one feature of the present invention resides, briefly stated, in a device for current or voltage supply, in which a current continuously flows through the indicator and its intensity is selected so that in an error-free operation the indicator is not released, and the current supply of the electrical consumer of the vehicle trailer is performed by this current.

When the device is designed in accordance with the present invention, a continuous and reliable voltage supply for an electrical consumer of the vehicle trailer is guaranteed, which operates independently from the operability of a sensor. Furthermore, it is advantageous that the current intensity for continuous supply of an electrical consumer can be selectively adjusted in certain limits, so that not only as in the known solution a current can be maintained whose intensity is determined by the sensor.

These advantages are obtained in the construction in which through an available indicating conductor between the pulling vehicle and the vehicle trailer, a constant current is supplied from the pulling vehicle to the trailer and its level is selected so that the indicator directly does not respond. From this flowing current, then the current or voltage supply for an electrical consumer of the vehicle trailer, for example an ABS control unit, can be derived. For this purpose in advantageous manner a network part is introduced, which is arranged in the vehicle trailer, and produces the regulated voltage required for operation of the consumer, for example of the control device, for continuously flowing current.

It is further advantageous that due to the continuous readiness of the control device, the computer and the sensor signal preparation are always continuously in operation, so that the regulating running of the anti-blocking system is improved. Simultaneously, a continuous sensor signal and computer monitoring is performed. Premature blocking during sputter braking and during braking with unfavorable, or in other words late switching braking light signal is avoided, and the error recognition and monitoring of the rotary speed feeler signals can be continuously active due to the guaranteed continuous supply. It is therefore guaranteed that the eventually occurring error can be recognized early, and can be indicated to the driver after its occurrence and not when the braking starts. Sporadic errors, for example intermittent contacts, can be reliably recognized. This is advantageous when compared with systems in which the error recognition is performed only during active anti-blocking regulation.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
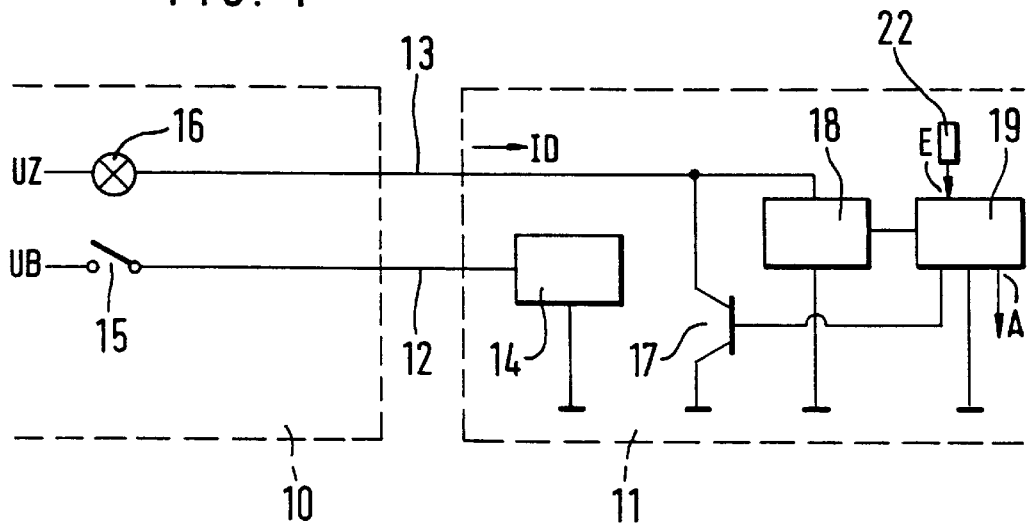
FIG. 1 is a view showing a device for current or voltage supply in a vehicle trailer in accordance with one embodiment of the present invention.

FIG. 1 shows a first embodiment of the device in accordance with the present invention. As can be seen from the drawing, a pulling vehicle 10 is connected with a trailer 11 through a brake light conductor 12 and an indicating conductor 13. Power steps 14 which activate magnetic valves of a braking system of the trailer are connected with the brake light conductor 12. The supply of the power steps 14 is turned on first from a braking start. With the braking start, a switch 15 is closed and the voltage UB is supplied to the power steps 14.

The indicating conductor 13 is located between an indicator 16 which is provided in the pulling vehicle and formed usually as a warning light, and an electronic system of the trailer 11 which includes a control transistor 17 and a standby network part 18. The standby network part 18 supplies the electrical consumer of the trailer, for example a control device 19, with a regulated permanent voltage, so that the control device is continuously ready and can perform the required steps.

The indicator 16 is conventionally connected in the pulling vehicle to the identified terminals KL 15. The voltage UZ is provided at the terminal KL 15 and selected so that during the total operational time of the vehicle a permanent current ID flows to the standby network part 18 of the trailer. The transistor 17 is conventionally blocked, and it is controlled from the control device 19 in its conductive state when the indicator 16 must be released. When the indicator 16, for example a warning light, is lit, a more intense current flows through the indicator 16 and the conducting transistor 17.

Figure 2:
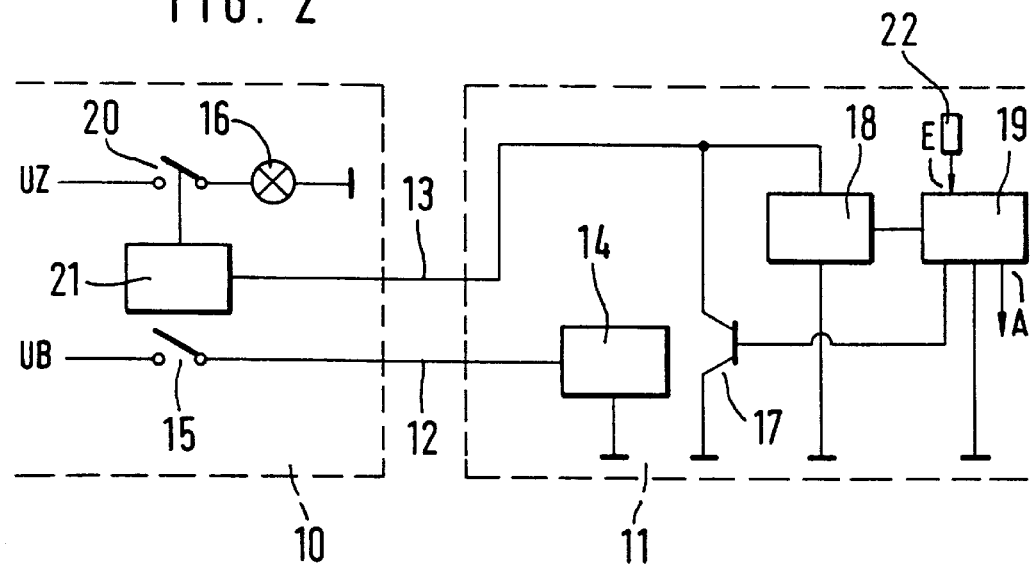
FIG. 2 is a view showing a device for current or voltage supply in accordance with another embodiment of the present invention.

The embodiment of FIG. 2 basically includes all elements of the embodiment of FIG. 1. Here the indicator 16 is located between a mass and a switch 20, through which the voltage UZ is supplied. The current is determined in a device for current measurement 21 and flows to the standby network part 18 of the trailer 11. The current to the standby network part 18 is selected in the embodiment of FIG. 2 so that the indicator 16 in normal state does not respond. By means of the transistor 17, a response of the indicator 16 can be released in the case of error.

With the embodiment shown in FIGS. 1 and 2, the inventive current or voltage supply can be realized. If the indicator 16 is formed as a warning light, it is connected to the terminal KL 15 of the pulling device and thereby is provided with voltage during the total operational time of the vehicle. When the warning light is an incandescent lamp, a small current can flow through the incandescent coil for supplying the electrical consumer of the trailer. This electrical consumer, as mentioned above, can be for example a control device, a computer, or a signal preparation unit. The maximum current intensity must be determined so that no recognizable brightness of the warning light occurs. A lighting of the warning light must be performed when a corresponding control signal of the transistor 17 is switched over.

If instead of the incandescent lamp, an indicator with low response threshold is utilized, this indicator is activated from a predetermined average current. With a corresponding design of the network part for supplying the control device or the computer, the warning light can be activated also in not braking case when an error is recognized. Since in this case a relatively high current flows, the energy for supply of the computer or computers can be taken from a low voltage drop of for example three volts during the controlling. If the control device is switched off in the case of error, the warning light can be activated without additional voltage drop by a self-containing end step.

The control device 19, which for example is the anti-blocking regulation device for the vehicle trailer, obtains through inputs E the signals from a sensor 22, for example a wheel rotary speed sensor, and performs computations, plauseability consideration for error recongition etc, to supply corresponding control signals through the outputs A. Since the control device 19 is permanently supplied with voltage, the required computations and plauseability searches for the error recognition are performed continuously.

It will be understood that each of the elements described above, or two or more together, may also find a useful application in other types of constructions differeng from the types described above.

While the invention has been illustrated and described as embodied in a device for current or voltage supply in vehicle, it is not intended to be limited to the details shown, since various modifications and structural changes may be made without departing in any way from the spirit of the present invention.

Without further analysis, the foregoing will so fully reveal the gist of the prsent invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A device for current or voltage supply in a vehicle trailer or vehicle support which is connected with a pulling vehicle through at least one braking light conductor and an indicating conductor and has at least one electrical consumer, the device comprising an indicator formed so that a current flows through said indicator permanently and its intensity is selected so that in an error-free operation said indicator does not respond, while a voltage supply to an electrical consumer of the vehicle trailer is performed by said current, said control device being formed so that an additional voltage which is an output voltage of at least one rotary speed sensor is supplied to said control device, said control device permanently performing an error recognition by monitoring of the supplied voltages with respect to their plausibility and in the case of an error releases a control signal for actuation.

2. A device as defined in claim 1, wherein said electrical consumer is a control device.

3. A device as defined in claim 1, wherein said indicator is formed as a warning light located in the pulling vehicle.

4. A device as defined in claim 1, wherein said indicator is formed as a warning light which contains an incandescent lamp.

5. A device as defined in claim 1; and further comprising a control device which includes an anti-blocking regulator for at least one of the vehicle trailer and the vehicle support.

6. A device as defined in claim 5; and further comprising a standby network part which from a supplied permanent current forms a regulated outlet voltage and supplies said regulated outlet voltage to said control device.

7. A device as defined in claim 1; and further comprising a transistor which is switched over by said control signal and thereby a current which flows through said indicator is so high that said indicator responds.

8. A device as defined in claim 2, wherein said control device is formed so that in the event of an error said control device is switched off, and said indicator is activated by a self-containing end step.

\* \* \* \* \*